(12) United States Patent
Rossi

(10) Patent No.: US 7,941,619 B1
(45) Date of Patent: May 10, 2011

(54) SPACE-OPTIMIZED BACKUP SET CONVERSION

(75) Inventor: Robert P. Rossi, Altamonte Springs, FL (US)

(73) Assignee: Symantec Operating Corporation, Mountain View, CA (US)

( * ) Notice: Subject to any disclaimer, the term of this patent is extended or adjusted under 35 U.S.C. 154(b) by 289 days.

(21) Appl. No.: 10/992,274

(22) Filed: Nov. 18, 2004

(51) Int. Cl.
*G06F 12/00* (2006.01)

(52) U.S. Cl. ............... 711/162; 711/E12.103; 707/625; 707/646

(58) Field of Classification Search ............... 711/162, 711/161
See application file for complete search history.

(56) References Cited

U.S. PATENT DOCUMENTS

| | | | |
|---|---|---|---|
| 5,559,991 A * | 9/1996 | Kanfi | 711/162 |
| 5,649,158 A | 7/1997 | Lahr et al. | |
| 5,720,026 A * | 2/1998 | Uemura et al. | 714/6 |
| 5,737,763 A | 4/1998 | Hilditch | |
| 5,751,997 A * | 5/1998 | Kullick et al. | 711/162 |
| 5,758,359 A | 5/1998 | Saxon | |
| 6,101,585 A * | 8/2000 | Brown et al. | 711/162 |
| 6,460,054 B1 | 10/2002 | Grummon | |
| 6,460,123 B1 * | 10/2002 | Blumenau | 711/162 |
| 6,526,434 B1 | 2/2003 | Carlson et al. | |
| 6,647,399 B2 * | 11/2003 | Zaremba | 707/204 |
| 6,647,474 B2 * | 11/2003 | Yanai et al. | 711/162 |
| 6,665,815 B1 | 12/2003 | Goldstein et al. | |
| 6,701,450 B1 | 3/2004 | Gold et al. | |
| 6,829,688 B2 | 12/2004 | Grubbs et al. | |
| 6,847,983 B2 | 1/2005 | Somalwar et al. | |
| 6,880,051 B2 | 4/2005 | Timpanaro-Perrotta | |
| 6,973,553 B1 * | 12/2005 | Archibald, Jr. et al. | 711/162 |
| 7,069,402 B2 | 6/2006 | Coulter et al. | |
| 7,103,740 B1 | 9/2006 | Colgrove et al. | |
| 7,155,465 B2 | 12/2006 | Lee et al. | |
| 7,171,538 B2 | 1/2007 | Kisley | |
| 7,251,749 B1 | 7/2007 | Fong et al. | |
| 7,392,357 B2 | 6/2008 | Ebata | |
| 7,415,585 B1 | 8/2008 | Rossi | |

(Continued)

FOREIGN PATENT DOCUMENTS

| EP | 1229448 A2 * | 8/2002 |
|---|---|---|
| JP | 2002304258 A * | 10/2002 |

OTHER PUBLICATIONS

Charles M Kozierok; "Raid Level 1"; http://web.archive.org/web/20010211020720/http://www.pcguide.com/ref/hdd/perf/raid/levels/singleLevel1-c.html; Site Version 2.1.1; Dec. 18, 2000; p. 1.*
Dood, ("Linux, Unix, and *nix like Operating Systems"), Jan. 15, 2004, pp. 9 http://www.webmasterworld.com/forum40/907.htm.*

*Primary Examiner* — Shane M Thomas
*Assistant Examiner* — Christopher D Birkhimer
(74) *Attorney, Agent, or Firm* — Meyertons, Hood, Kivlin, Kowert & Goetzel, P.C.; B. Noel Kivlin

(57) ABSTRACT

A system for space-optimized backup set conversion may include a backup converter and a first sequence of backup images of a data source. Each backup image may be of a particular backup image type, such as a full image, a differential image, or an incremental image. The backup converter may be configured to convert the first sequence of backup images into a second sequence of backup images by converting a particular backup image of the first sequence into a transformed backup image of a different backup type. For example, a full image may be converted into either a differential image or an incremental image, and a differential image may be converted into an incremental image.

15 Claims, 10 Drawing Sheets

U.S. PATENT DOCUMENTS

| | | |
|---|---|---|
| 2003/0145248 A1 | 7/2003 | McNeil |
| 2003/0163493 A1 | 8/2003 | Burns |
| 2003/0177149 A1* | 9/2003 | Coombs ............... 707/204 |
| 2003/0212869 A1* | 11/2003 | Burkey ............... 711/162 |
| 2004/0030852 A1 | 2/2004 | Coombs |
| 2004/0268068 A1 | 12/2004 | Curran |

* cited by examiner

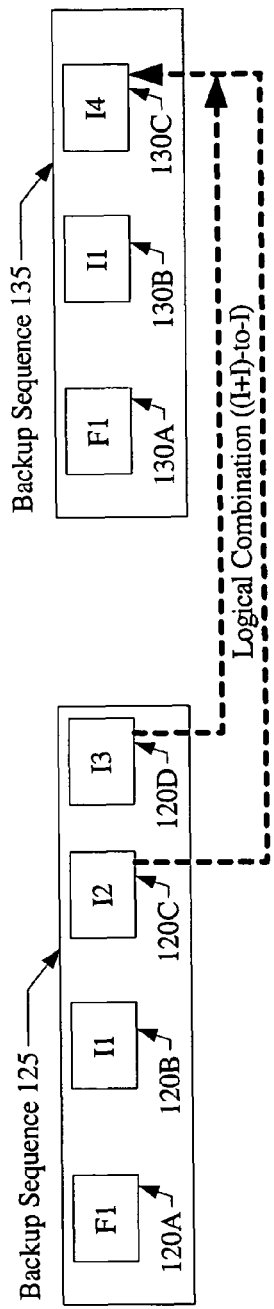
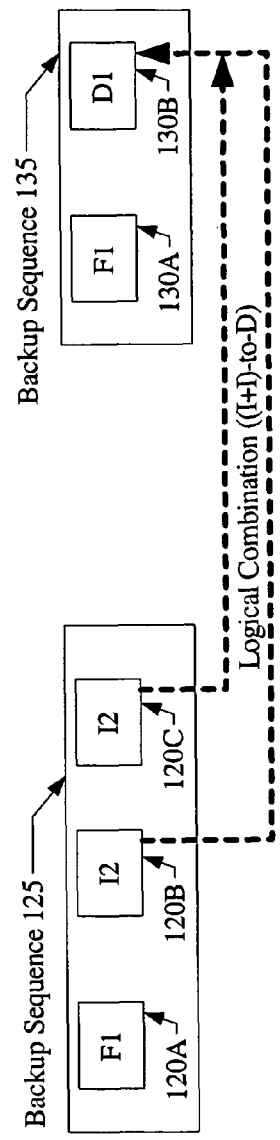
FIG. 5a
FIG. 5b

SPACE-OPTIMIZED BACKUP SET CONVERSION

BACKGROUND OF THE INVENTION

1. Field of the Invention

This invention relates to computer systems and, more particularly, to backup management within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of failures, such as system crashes, hardware storage device failures, and software defects, may potentially lead to a corruption or a loss of critical data in such environments. In order to recover from such failures, various kinds of backup techniques may be employed. Traditionally, for example, backup images of critical data may have been created periodically (e.g., once a day) and stored on tape devices. As prices for random access media such as disk devices have continued to fall, some information technology (IT) organizations have begun to use random access media for storing backup images as well. In some storage environments, multiple layers of storage may be dedicated to storing backup images: e.g., backup images may be stored on disk or on a particular type of tape device initially, and staged periodically to a second type of tape device or other secondary media for long-term storage.

Backup solution vendors may allow users to create several different types of backup images for a given data source (e.g., one or more file systems), such as full images, differential images, and incremental images. A full image may include a complete copy of the data source, e.g., a copy of all the files within one or more file system, and so may be used to restore the state of the data source as of the time the full image was created, without a need to access any other backup image. Differential and incremental images may include changes that may have occurred at the data source over a period of time, rather than the full contents of the data source, and may therefore typically require less storage than full images. Differential images and incremental images may typically be created and managed as part of a sequence of backup images, where the sequence includes at least one full image, and may be used in combination with a previously created full image within the sequence to restore the state of the data source. Such a sequence of backup images for a data source may also be referred to as a backup set. Differential and incremental images may differ from each other in the number of backup images that may need to be analyzed or processed during restoration of the state of the data source.

For example, in one environment, a full image ("F-Sun") of a data source may be created every Sunday, and a differential image (e.g., "D-Mon", "D-Tue", "D-Wed", etc.) may be created every other day of the week. In such an example, a differential backup image "D-Wed" created on a Wednesday may include sufficient information that, when combined with the information stored in the previous full image "F-Sun", allows the state of the data source as of Wednesday to be restored. Thus, a differential image may contain information on all the changes affecting backup that may have occurred at the data source since a previous full image was created.

In a second example, a full image ("F-Sun") of a data source may also be created every Sunday, but incremental images (e.g., "I-Mon", "I-Tue", "I-Wed") may be created every other day of the week. In this second example, information contained within "I-Wed" may have to be combined not only with information contained within "F-Sun", but also with information contained within all intermediate incremental images (i.e., "I-Mon" and "I-Tue"), in order to restore the state of the data source as of Wednesday. That is, an incremental image may only contain information on the changes affecting backup that may have occurred at the data source since an immediately previous image of any kind was created. The immediately previous image may be another incremental image, a differential image, or a full image. Restoration using a given incremental image may therefore typically require processing more backup images than restoration using a differential image, especially as the number of intermediate incremental images between the last full image and the given incremental image increases.

Both incremental images and differential images may usually require less storage space than full images, and an incremental image may often require less storage space than a differential image created at about the same time for the same data source. For large data sources, such as file systems or volumes that collectively occupy terabytes of storage space, the difference in storage space requirements for the different backup image types may be substantial. A technique or method that reduces the amount of storage space needed to store backup sequences while retaining the ability to restore data source state as of desired points in time may therefore be desirable.

SUMMARY OF THE INVENTION

Various embodiments of a system and method for space-optimized backup set conversion are disclosed. According to a first embodiment, the system may include a backup converter and a first sequence of backup images of a data source. Each backup image may be of a particular backup image type, such as a full image, a differential image, or an incremental image. The backup converter may be configured to convert the first sequence of backup images into a second sequence of backup images by converting a particular backup image of the first sequence into a transformed backup image of a different backup type. The transformed backup image may typically require less storage space than the particular backup image from which it may be derived. For example, a full image may be converted into either a differential image or an incremental image, and a differential image may be converted into an incremental image.

Several other embodiments are also disclosed. According to another embodiment, a system may include a backup converter and a first sequence of backup images including a first and a second incremental image of a data source. The backup converter may be configured to logically combine the first and second incremental images into a single image. The single image may be another incremental image or a differential image. The logically combined single image may contain enough information to restore the state of the data source as of the time that the second incremental image was created.

In one embodiment, the first sequence of backup images may be stored at one or more random access storage devices such as disks or disk arrays. The second sequence of backup images may also be stored on random access storage devices in one embodiment. In another embodiment, the second sequence may be stored at one or more secondary storage devices, which may include, for example, tape-based devices. In such an embodiment, the first sequence of backup images

BRIEF DESCRIPTION OF THE DRAWINGS

FIGS. 5a and 5b are block diagrams illustrating two exemplary backup sequence conversions according to one embodiment, where a backup converter may be configured to logically combine two incremental images into a single backup image.

Figure 1:
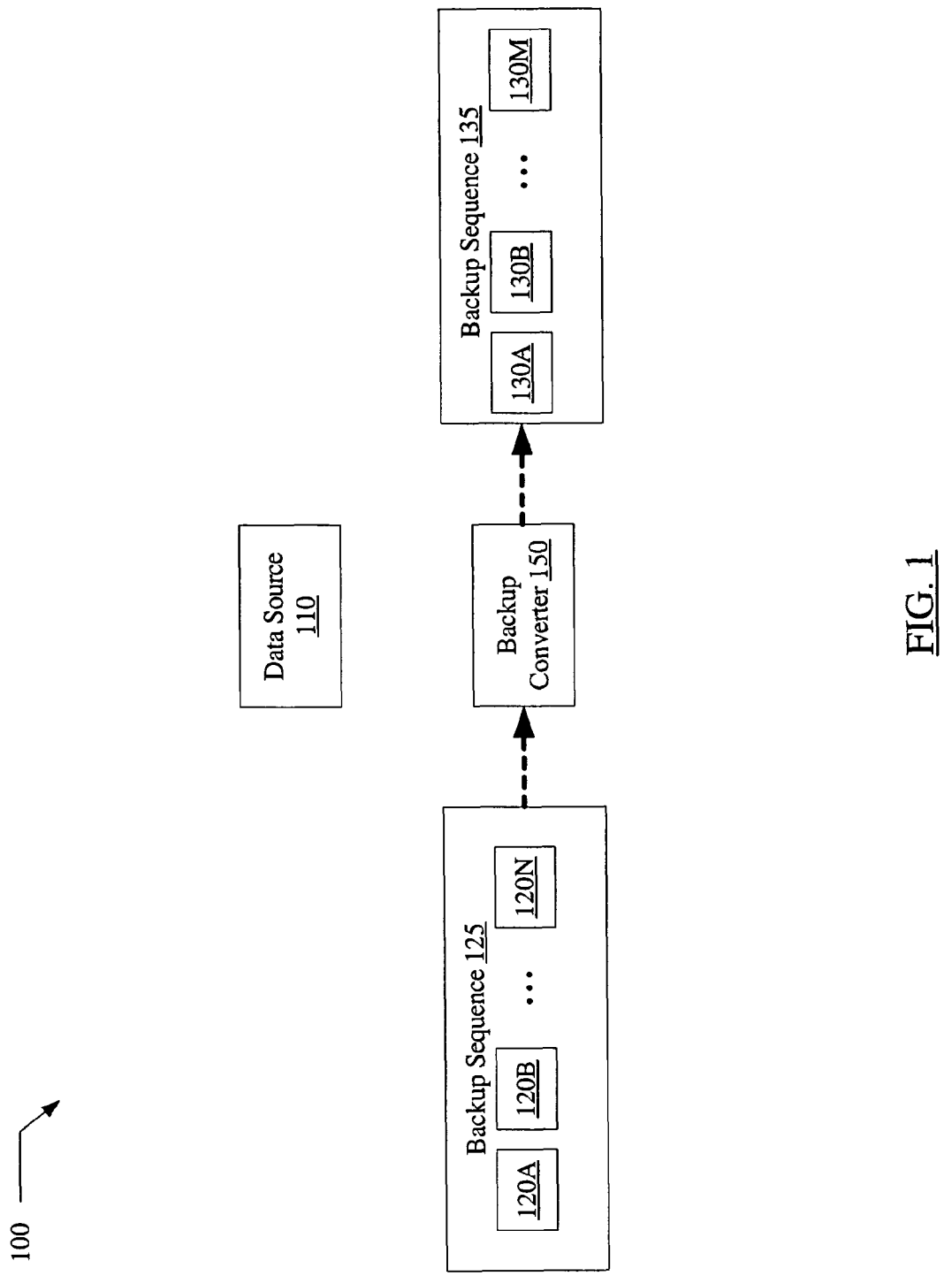
FIG. 1 is a block diagram of a system according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram of a system 100 according to one embodiment. The system includes a first backup image sequence 125 and a backup converter 150. The first backup image sequence 125 may include a plurality of backup images 120A, 120B, . . . 120N (which may be collectively referred to herein as backup images 120) of a data source 110. The backup converter may be configured to convert the first backup image sequence 125 into a second backup image sequence 135 including a plurality of backup images 130A, 130B, . . . 130M (collectively, backup images 130). Backup images 120 may include full, differential and incremental images, as described below in further detail. During the conversion of backup image sequence 125, backup converter 150 may be configured to convert a particular backup image 120 to a transformed backup image 130 of a different backup type (where the set of possible backup types for transformed backup images may include differential and incremental images). In some embodiments, backup converter 150 may also be configured to perform multiple backup image conversions during a single backup image sequence conversion, and/or to logically combine two or more backup images 120, as described below in further detail. In the subsequent description, the phrases "backup sequence" and "backup set" may each be considered synonymous to the phrase "backup image sequence".

Individual backup images 120 of backup sequence 125 may represent the state of a data source at different points in time. For example, backup image 120A may be created at a certain time T1, backup image 120B at a later time T2, and so on. Any of a variety of backup solutions from different vendors, such as the VERITAS NetBackup™ Server product from VERITAS Software Corporation, may be used to create backup sequence 125. Such backup solutions may, for example, allow users to specify various parameters related to the data source, the times at which backup images 120 are created (i.e., a backup schedule), the backup types of individual backup images 120, as well as the locations or devices where the backup images 120 are to stored.

Parameters related to the data source may include names of backup client hosts, as well as the specific directories, folders, files, volumes, file systems, or other virtual storage devices on the backup client hosts that make up the set of data for which backup images are to be created. In some cases, it may be possible to list not only the storage objects (e.g., files) that are to be included within the backup image, but also to list specific storage objects (such as directories for temporary files) that are to be excluded from the backup images. Storage objects from multiple client hosts may be included within a single backup image in some embodiments.

A backup schedule may allow a user to specify when backups of different types are to occur. For example, according to one schedule, a full backup image of the data source (i.e., a copy of all data objects within the data source that are not explicitly excluded from the backup) may be created every week during a specified time interval (e.g., between 1 AM and 7 AM on Mondays). According to a second schedule, a differential backup image (i.e., an image incorporating data source changes that may have occurred since the last full image was created) may be created once a day. According to a third schedule, an incremental backup image (i.e., an image incorporating data source changes that may have occurred since the last backup image of any type was created) may be created after every work shift (e.g., after every eight hours). Some backup solutions may allow multiple schedules to be operational in parallel, or allow the inclusion of different backup types within a single schedule. Users of the backup solutions may also specify storage devices (e.g., disk drives or tape drives) or locations (e.g., directories) where the created backup images may be stored, as well as various other parameters related to backup image creation (e.g., whether a set of trusted users is allowed to initiate backup image creation during specified time intervals, steps to be taken when exceptional conditions or errors occur, etc.).

Various factors may be considered in selecting the types and frequencies of backups to be performed during a backup schedule. Full backups may take up the most storage space, for example, but may also support a simple restoration process. Restoration to a point in time when a full backup F1 was created may require the use of no backup image other than F1 itself. In contrast, if a backup sequence or backup set consists of a full image F1 created at a time T1, followed by a sequence of consecutive incremental images I1, I2, and I3 (created at respective times T2, T3, and T4), and a restoration of the data source as T4 is desired, the backup solution may need to access each of the backup images in sequence and perform restoration for each successive backup image. First the state of the data source as of time T1 may be restored using F1, then changes between T1 and T2 may be applied using I1, and so on. Thus there may be a tradeoff between storage space usage and the resources required for restoration. Differential images may lie between full images and incremental images, both in storage space requirements and in resources required for restoration.

As the number of backup images 120 within backup sequence 125 increases, the total storage space required for backup sequence 125 may increase as well. The rate of increase in storage requirements may depend on a variety of factors, such as the types of backups in the sequence and the frequency of updates to the data source. For large data sources (e.g., data sources including hundreds of gigabytes or multiple terabytes of data), especially data sources supporting update-intensive applications such as on-line transaction processing (OLTP) systems, the total amount of storage required for backup sequence 125 may rapidly approach unmanageable levels. In order to reduce the storage required, backup converter 150 may be configured to convert a backup image 120 to a different type of backup image 130, where the converted or transformed backup image 130 is of a different backup type than the source backup image 120 from which it is derived, and where the converted or transformed backup image requires less storage space than its source backup image. As described below in conjunction with the descriptions of FIG. 2a-2c, some images within backup sequence 125 may not be altered during the sequence conversion.

Figure 2A:
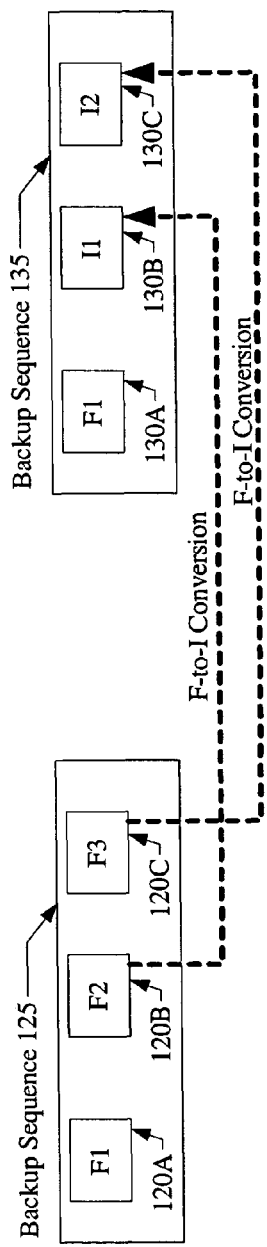
FIG. 2a, FIG. 2b, and FIG. 2c are block diagrams illustrating exemplary backup sequence conversions that may be performed by a backup converter according to one embodiment.
Figure 2B:
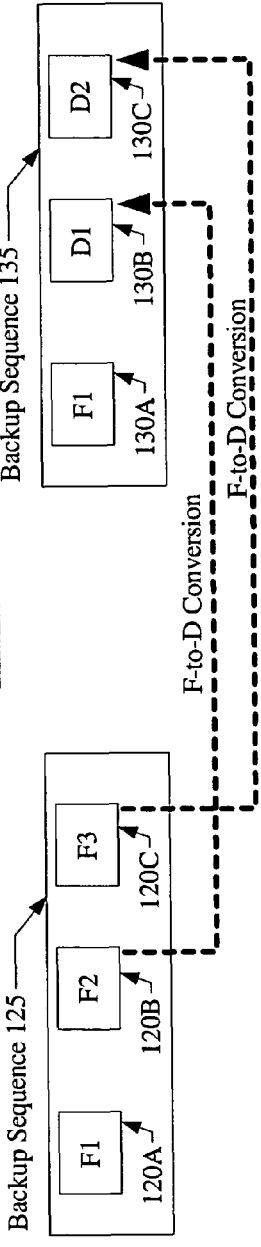
Figure 2C:
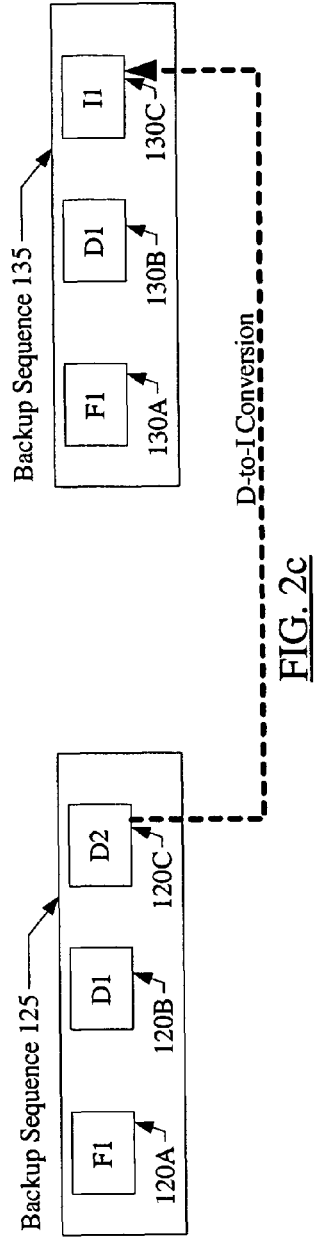
Figure 3:
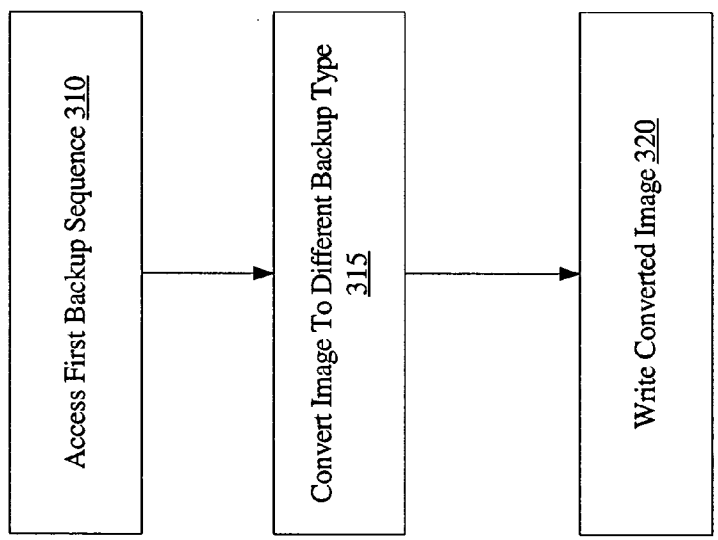
FIG. 3 is a flow diagram illustrating aspects of the operation of a backup converter according to one embodiment.

FIG. 2a, FIG. 2b, and FIG. 2c are block diagrams illustrating exemplary backup sequence conversions that may be performed by backup converter 150 according to one embodiment, and FIG. 3 is a flow diagram illustrating aspects of the operation of backup converter 150 according to one embodiment. In each of FIG. 2a-2c, backup sequence 125 includes three backup images 120A-120C. In FIG. 2a and FIG. 2b, each backup image 120A-C is a full backup image, as indicated by the corresponding backup image name (F1 for backup image 120A, F2 for backup image 120B, and F3 for backup image 120C). In FIG. 2c, backup sequence 125 consists of a full backup image F1 followed by two differential images D1 and D2. Backup converter 150 may be configured to access backup sequence 125 (block 310 of FIG. 3) and convert one or more images 120 of backup sequence 125 (e.g., F2 and F3 in the case of FIG. 2a) into corresponding images 130 of a different backup type (block 315 of FIG. 3). After each backup image is converted, the corresponding transformed image may be written to a storage device (block 320). In some embodiments, e.g., where the converted backup sequence is being written to sequential media as described below, one or more unaltered backup images from backup sequence 125 may also be written to the storage device along with the transformed backup images.

In FIG. 2a, backup converter 150 converts full images F2 and F3 into incremental images I1 and I2, respectively. In FIG. 2b, full images F2 and F3 are converted into differential images D1 and D2, respectively, while in FIG. 2c, D3 is converted into incremental image I1. The three backup type conversions illustrated in FIG. 2a-2c are, respectively, full image to incremental image (which may be referred to herein as an F-to-I conversion), full image to differential image (abbreviated as F-to-D) and differential image to incremental image (abbreviated as D-to-I). In each case, the transformed image may require less storage space than its corresponding source image. In some embodiments, once the transformed backup images have been saved, the original or source images may be discarded or removed, thereby reducing the total amount of storage required for backup images. In other embodiments, the original backup images may be overwritten in place by the transformed backup images.

Figure 4:
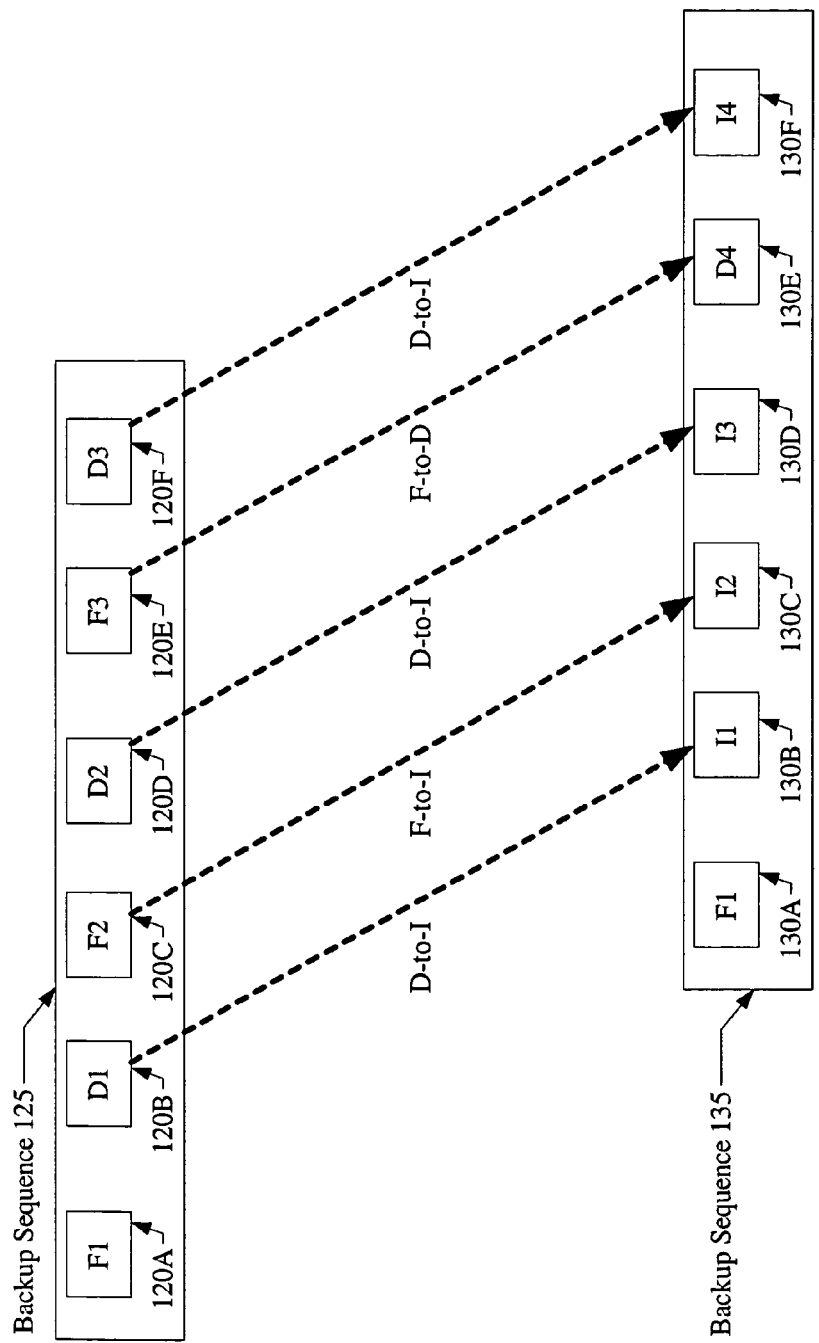
FIG. 4 is a block diagram illustrating an embodiment where three backup type conversions may be performed within a single exemplary backup sequence conversion.

It is noted that the backup type transformations described above may be utilized for backup sequences of any length (greater than one), and that more than one backup type conversion (from among F-to-I, F-to-D, and D-to-I conversions), may be applied within a single backup sequence transformation. FIG. 4 is a block diagram illustrating an embodiment where all three backup type conversions may be performed within a single exemplary backup sequence conversion. Backup sequence 125 in FIG. 4 includes backup images (F1, D1, F2, D2, F3, D3), while converted backup sequence 135 includes backup images (F1, I1, I2, I3, D4, I4). As shown, backup converter 150 may convert full image F2 into incremental image I2 (an F-to-I conversion), full image F3 to differential image D4 (F-to-D), while differential images D1, D2 and D3 may be converted into incremental images I1, I3 and I4, respectively (which may represent D-to-I conversions).

During conversion of a backup sequence 125, backup converter 150 may need to perform several intermediate steps. In one embodiment, for example, backup converter 150 may be configured to select among several possible transformations. For example, a backup sequence 125 of three full images (F1, F2, F3) may be converted into any one of several transformed sequences, such as (F1, I1, I2), (F1, D1, D2), (F1, I1, D1), (F1, D1, I1), (F1, I1, F3), etc. Backup converter may use a variety of techniques to select the specific type transformations to apply. For example, in one embodiment, backup converter 150 may require a listing of desired transformations to be provided in advance by a user, e.g., a system administrator. In another embodiment, backup converter may be configured to select among possible transformations based on different desired levels of space savings: e.g., if space saving is to be maximized, all possible full and differential images may be transformed. The desired level of space saving may be provided to backup converter 150 via a configuration parameter or some other suitable interface, and a default level may be used if a value is not specified via the interface. In other embodiments, backup converter 150 may be configured to use heuristics, e.g., rules based on measurements of space usage, to decide the specific transformations to be performed, Once the specific transformations are determined, backup converter 150 may perform one or more analysis steps, where, for example, the data differences between successive backup images of backup sequence 125 are computed (such as files that were modified, created or deleted between the creation times of the successive backup images). In some embodiments, backup converter 150 may focus on one backup image conversion at a time: e.g., during a conversion of a backup sequence (F1, F2, F3) to (F1, I1, I2) backup converter may first convert (F1, F2, F3) to (F1, I1, F3), and then, in a logically independent step, convert (F1, I1, F3) to (F1, I1, I2). In other embodiments, backup converter 150 may be configured to combine at least part of the analysis for multiple image transformations prior to completing any one transformation, or may be configured to perform multiple transformations in parallel.

In the embodiments illustrated in FIG. 2a-2c, and FIG. 4, the total number of backup images may remain unchanged during the conversion of backup sequence 125 to backup sequence 135. That is, for every point of time at which a backup image was created for backup sequence 125, a corresponding backup image may exist in converted backup sequence 135, allowing the state of the data source to be restored to any of those points of time. In some embodiments, it may be desired to logically combine two or more backup images 120 into a single backup image 130, thus reducing the total number of backup images during backup sequence conversion, while still retaining enough information to allow data source restoration as of some subset of desired backup creation times.

Figure 6:
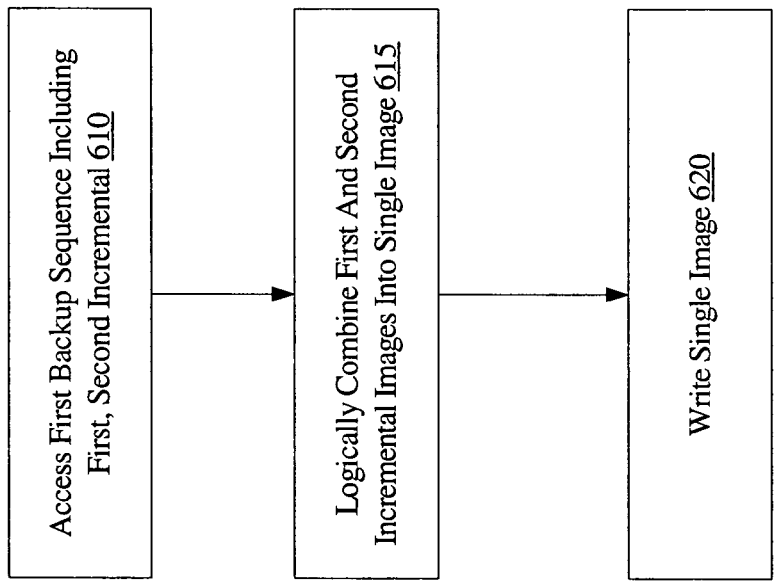
FIG. 6 is a flow diagram illustrating aspects of the operation of a backup converter in an embodiment where two incremental images are logically combined.

FIGS. 5a and 5b are block diagrams illustrating two exemplary backup sequence conversions according to one such embodiment, where backup converter 150 may be configured to logically combine two incremental images (I1 and I2) of backup sequence 125 into a single backup image in backup sequence 135. FIG. 6 is a flow diagram illustrating aspects of the operation of backup converter 150 in such an embodiment. As shown in FIG. 6, backup converter 150 may be configured to access backup sequence 125 (block 610), logically combine two incremental backup images (block 615), and write the combined image to one or more storage devices (block 620). In FIG. 5a, incremental images I1 and I2 are logically combined into a single incremental image I4 (which may be termed an (I+I)-to-I combination), while in FIG. 5b, incremental images I1 and I2 are logically combined into a single differential image D1 (which may be termed an (I+I)-to-D combination). When performing a logical combination of two consecutive incremental images I1 and I2, the changes incorporated within each incremental image may be reflected in the combined image I4 or D1, so that the state of the data source as of the time that I2 was created may be restored if needed. However, in one embodiment, any changes incorporated within I1 (such as a creation of a particular file "fileA") that are reversed or undone between the creation of I1 and I2 (e.g., a deletion of the file "fileA") may not be reflected in the combined image I4 or D2.

Figure 7:
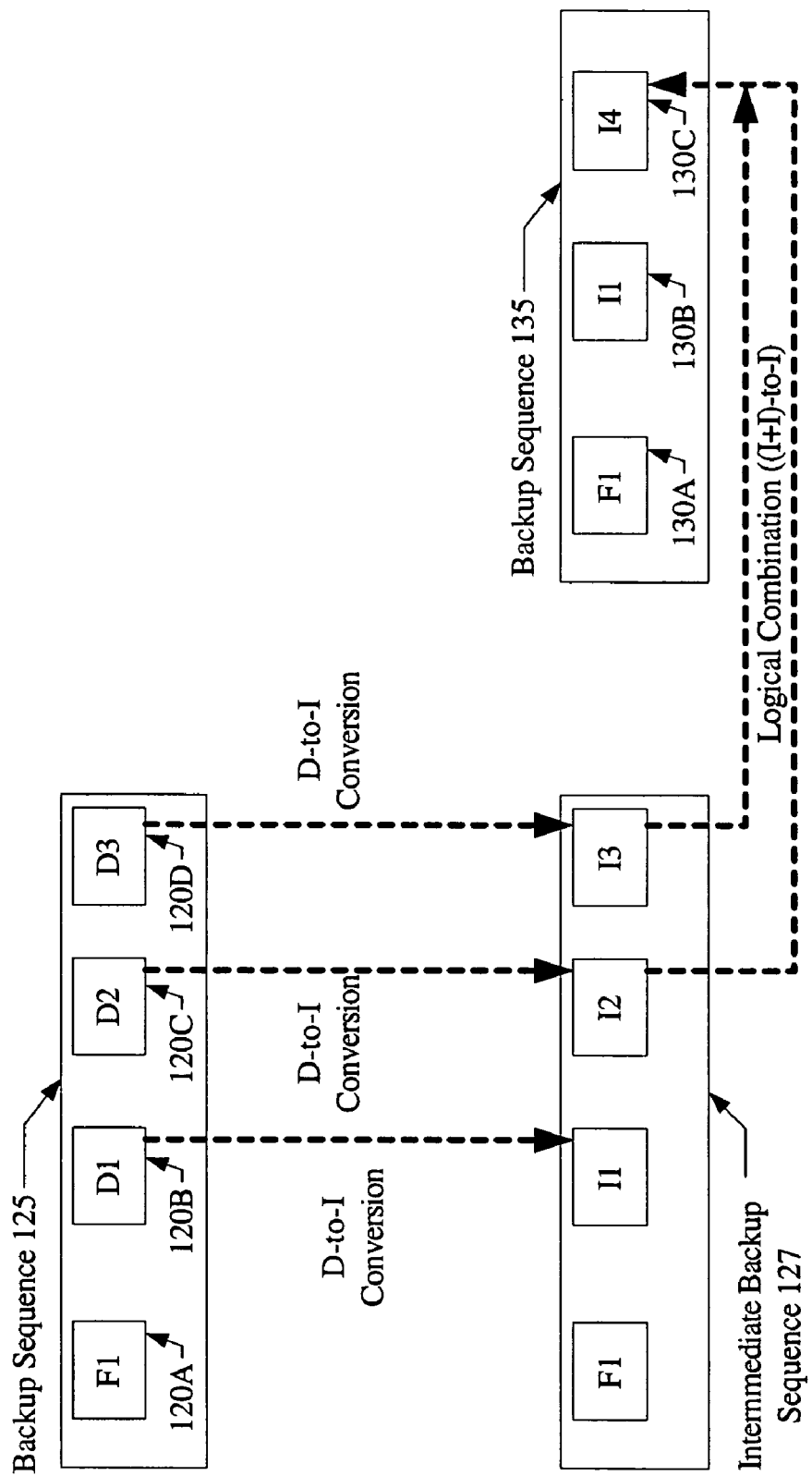
FIG. 7 is a block diagram illustrating an exemplary two-step backup sequence conversion according to one embodiment

It is noted that backup converter 150 may be configured to apply any or all of the backup image type transformations depicted in FIG. 2a-2c and FIG. 4 and the logical combination techniques depicted in FIG. 5a-5b, to a single given backup sequence 125. FIG. 7 is a block diagram illustrating an exemplary two-step backup sequence conversion according to one embodiment, where D-to-I backup type transformations are performed during a first step resulting in intermediate backup sequence 127, and a logical combination ((I+I)-to-I) is performed during a second step. In some embodiments, image type transformations and logical combinations may be performed during a single step rather than in two separate steps as depicted in FIG. 7.

Figure 8:
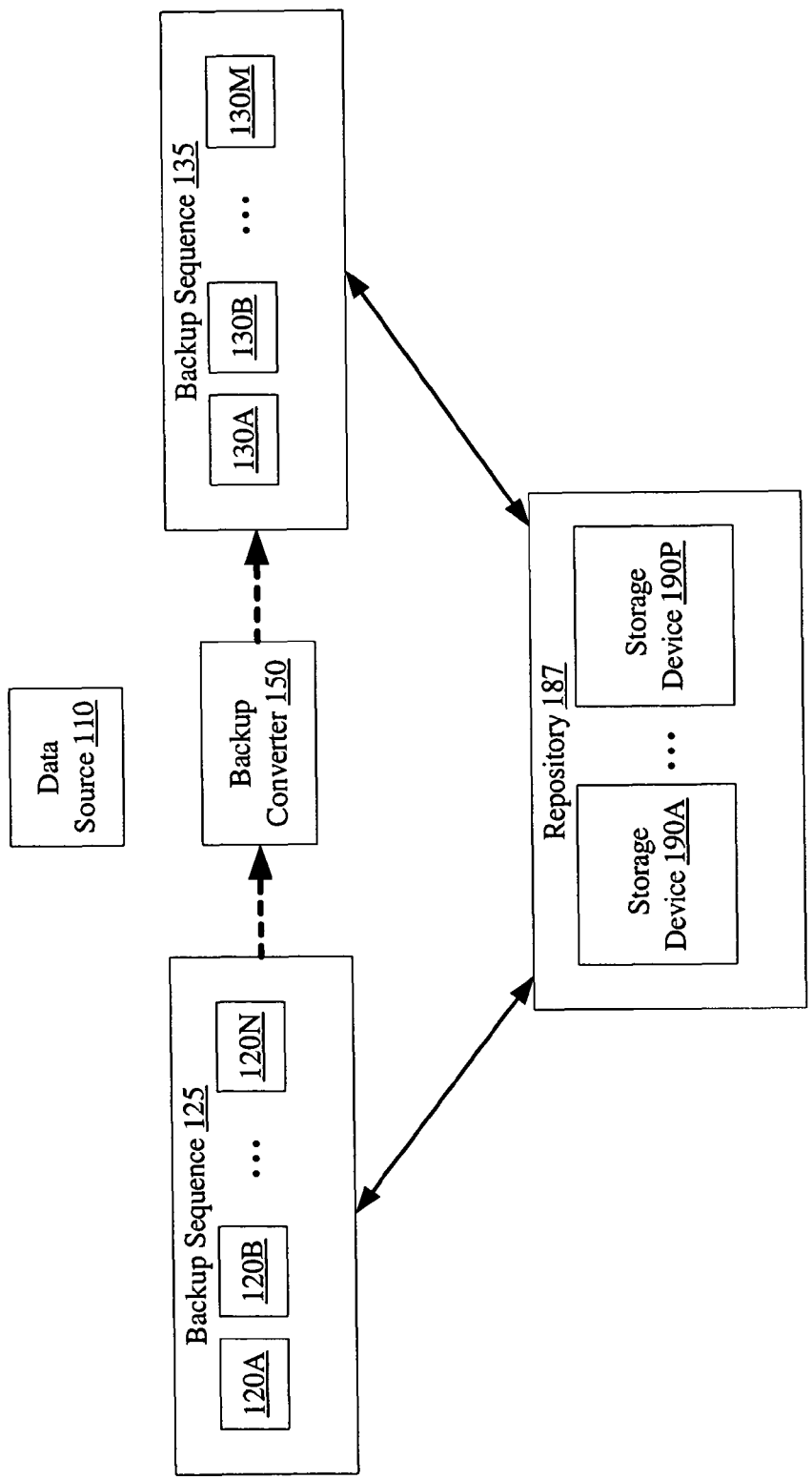
FIG. 8 is a block diagram illustrating a storage repository where backup sequences may be stored, according to one embodiment.

FIG. 8 is a block diagram illustrating a storage repository 187 where backup sequences 125 and 135 of system 100 may be stored, according to one embodiment. As shown, repository 187 may include a plurality of storage devices 190A, . . . 190P (collectively, storage devices 190). In some embodiments, storage devices 190 may include any of a variety of random access devices such as disks, disk arrays, intelligent disk arrays, CD-RW devices, DVD-RW devices, and the like, which may be hosted at a single host, distributed across multiple hosts or storage servers, and/or accessible via a network such as a storage area network. In other embodiments, sequential access devices such as various kinds of tape devices (e.g., 8 mm tape devices, Digital Linear Tape (DLTT™) devices, Advanced Intelligent Tape (AIT™) devices, Linear Tape Open (LTO) devices, etc.) may be included within storage devices 190, or a combination of random access and sequential access devices may be included. Any appropriate storage protocol, such as various variants of SCSI (Small Computer System Interface), Fibre Channel, etc., may be used to access storage devices 190, as desired. In some embodiments the converted or transformed backup sequence 135 may be saved in a different location from the location used for original backup sequence 125, i.e., without overwriting any part of original backup sequence 125. In such embodiments, as described earlier, after backup sequence 135 is saved or written to storage devices 190, part or all of backup sequence 125 may be discarded, thus allowing a re-use of storage space. In other embodiments, part or all of original backup sequence 125 may be overwritten by transformed backup sequence 135.

Figure 9:
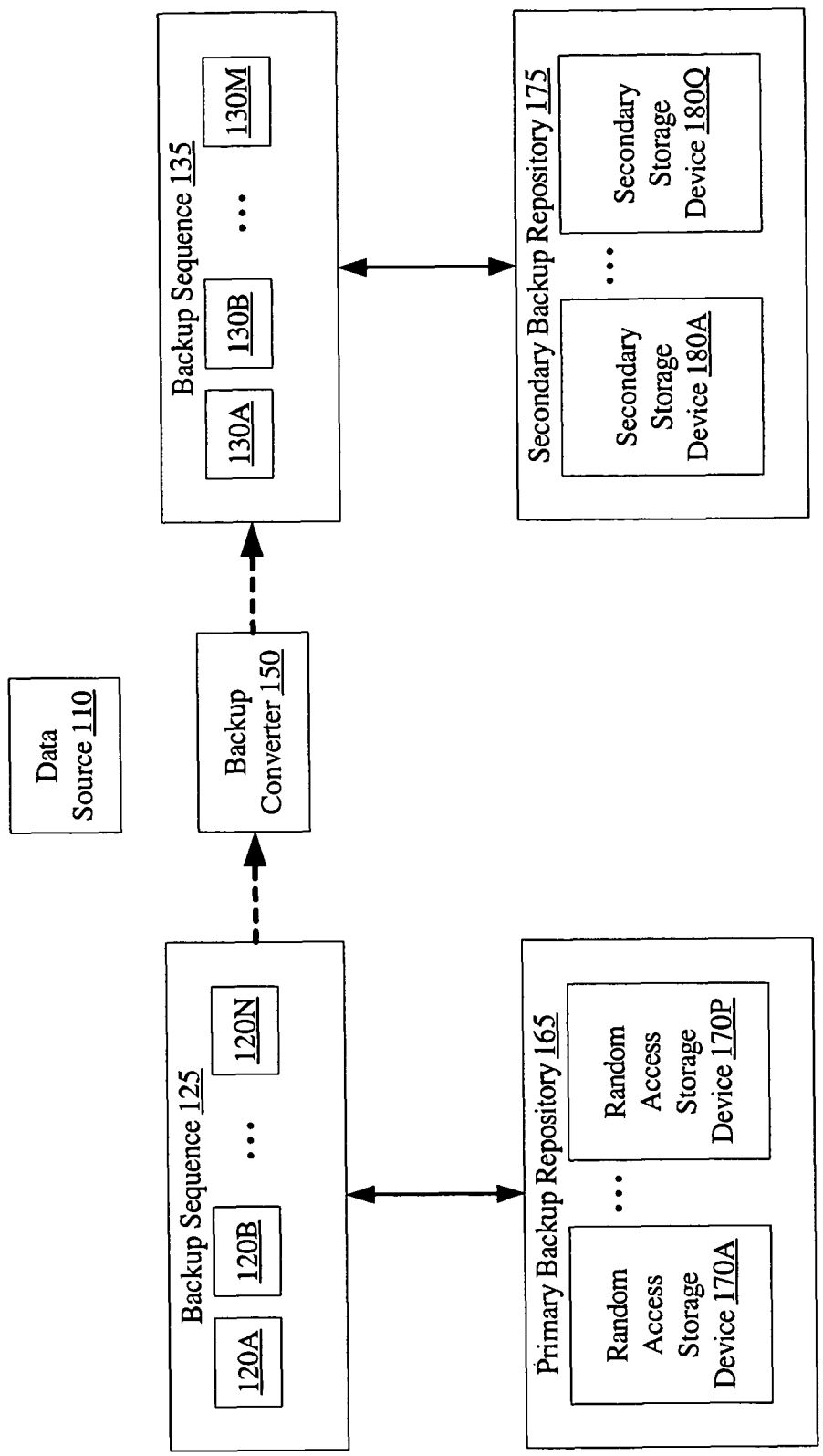
FIG. 9 is a block diagram illustrating a primary backup repository and a secondary backup repository that may be used for storing backup sequences, according to one embodiment.

As described above, in some embodiments both the original backup sequence 125 and the transformed backup sequence 135 may be stored on random access storage devices (e.g., in a single repository 187). The techniques of reducing space requirements described above may also be utilized during staging of backup images to secondary backup repositories, e.g., for long-term archival. FIG. 9 is a block diagram illustrating a primary backup repository 165 and a secondary backup repository 175 that may be used for storing backup sequences 125 and 135 respectively of system 100, according to one embodiment. As shown, primary backup repository 175 may include random access storage devices 170A, . . . 170P such as any of the random access storage devices described above in conjunction with the description of FIG. 8. Secondary backup repository 175 may include any suitable secondary storage devices, such as the tape devices listed earlier, and/or other devices appropriate for long-term storage or archival purposes, e.g., CD-ROM devices, DVD-ROM devices, etc. In some embodiments, backup image transformations and/or logical combination of backup images may be performed "on the fly" during staging to secondary backup repository 175. In one embodiment, both primary backup repository 165 and secondary backup repository 175 may include tape devices. In yet another embodiment, multiple levels of backup repositories may be used: e.g., a primary backup repository for a week's collection of backup images, a secondary backup repository for a month's collection of backup images, and a tertiary backup repository for storing backup images older than a month. In such embodiments, the backup sequence conversion techniques described above may be used during transfers of backup images from any level of backup repository to another. Both the time taken to stage backup images to a different level of repository, and the space occupied by the staged backup images, may be reduced using backup conversion. In different embodiments, the storage devices of a given repository layer may be distributed across multiple hosts, may be accessible via storage area networks or some other network, or may be managed at a single computer host.

It is noted that data source 110 may include a variety of different storage objects in different embodiments. For example, in one embodiment data source 110 may include the files of one or more file systems. The file systems may include distributed file systems and/or single-host file systems from one or more hosts. In another embodiment, data source 110 may be a collection of one or more block virtual devices such as logical volumes (e.g., backup images 120 may be created at the block or volume level rather than at a file level), or may include other types of logical storage objects such as pointers to files or volume partitions. In some embodiments the data to be backed up may be compressed during backup sequence conversion, to further reduce storage space requirements.

Backup converter 150 may be configured to convert backup sequence 125 into backup sequence 135 in response to any of a variety of triggering events or conditions in different embodiments. In one embodiment, the triggering event may be an expiration of an interval of time specified in a schedule. In other embodiments, a triggering policy based on metrics such as device utilization or storage capacity thresholds may be employed: for example, conversion may be triggered if the total storage used for backup sequence 125 exceeds a designated threshold. In some embodiments, administrative commands (e.g. via a graphical user interface or a command-line tool) may also be used to initiate backup sequence conversions.

Backup converter 150 may be any device or software module that may be capable of providing the functionality described above. For example, in one embodiment, backup converter 150 may be incorporated as a layer or component within a backup management software program, while in another embodiment, backup converter 150 may be a stand-alone program. In one embodiment, backup converter 150 may be incorporated within a computer host, such as a server computer that includes one or more processors and one or more system memories. In one implementation, backup converter 150 and part or all of a data source 110 (such as a file system) may be co-located at the same host or server, while in other implementations, backup converter 150 may be hosted at one or more storage servers managing a backup repository, or at a server dedicated for backup purposes. The functionality of backup converter 150 may also be implemented cooperatively using a plurality of computer hosts in some embodiments: for example, a user interface component of backup converter 150 (which may be used, for example, to obtain input selecting the specific backup image transformations desired from a number of possible transformations) may be incorporated at one or more client computer hosts, while processing required for the transformation or transformations may be conducted at one or more server hosts. Backup converter 150 may also be configured for high availability (e.g., clustered for failover) in one embodiment.

Figure 10:
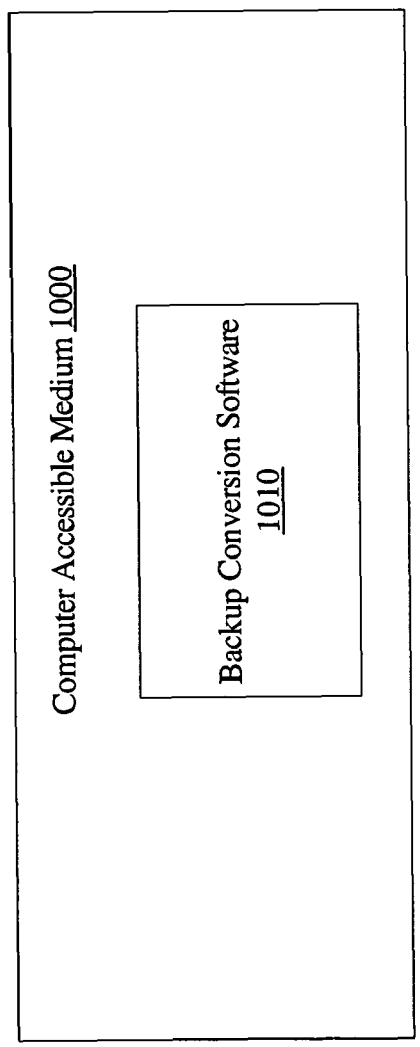
FIG. 10 is a block diagram of one embodiment of a computer accessible medium.

FIG. 10 is a block diagram of one embodiment of a computer accessible medium 1000, comprising backup conversion software instructions 1010 executable to perform the functionality of backup converter 150 as described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
 a backup storage configured to store a first sequence of two or more backup images of a data source including a first full backup image representing a state of the data source at a first time T1 and a second full backup image representing the state of the data source at a second time T2; and
 backup management software stored on a computer accessible storage medium, wherein the backup management software includes instructions that implement a backup converter executable to access the first full backup image and the second full backup image on the backup storage to create a first differential backup image representing the state of the data source at the time T2, wherein the backup converter is executable to create the first differential backup image by determining and storing data differences between the second full backup image and the first full backup image;
 wherein the backup converter is further executable, in response to determining that a storage amount used to store the first sequence of two or more backup images exceeds a designated threshold, to:
 create the first differential backup image; and
 store the first differential backup image on the backup storage and to discard the second full backup image from the backup storage such that the second full backup image is no longer accessible anywhere on the backup storage, thereby allowing re-use of storage space made available on the backup storage a result of discarding the second full backup image while still retaining the first full backup image representing the state of the data source at the time T1 and the first differential image representing the state of the data source at the time T2 on the backup storage.

2. The system as recited in claim 1, wherein the backup converter is further executable to access a third full backup image of the first sequence representing the state of the data source at a time T3, wherein the backup converter is further executable to create a second differential backup image representing the state of the data source at the time T3 by determining and storing data differences between the third full backup image and the second full backup image.

3. The system as recited in claim 1, wherein the backup converter is further executable to access a third full backup image of the first sequence representing the state of the data source at a time T3 to create a first incremental backup image representing the state of the data source at the time T3.

4. The system as recited in claim 3, wherein the backup converter is further executable to create the first incremental backup image by determining and storing data differences between the third full backup image and the second full backup image.

5. The system as recited in claim 1, wherein the backup management software is executable to store the first sequence of two or more backup images on the backup storage by performing a plurality of successive backup operations on the data source.

6. The system as recited in claim 5, wherein the backup management software is executable to store the first sequence of two or more backup images on the backup storage according to a backup schedule.

7. A computer accessible storage medium storing backup management software including instructions executable to:
 access a first full backup image and a second full backup image of a first sequence of backup images stored on a backup storage, wherein the first full backup image represents a state of a data source at a first time T1 and the second full backup image represents the state of the data source at a second time T2; and
 in response to determining that a storage amount used to store the first sequence of two or more backup images exceeds a designated threshold:
 create a first differential backup image representing the state of the data source at the time T2 by determining and storing data differences between the second full backup image and the first full backup image; and store the first differential backup image on the backup storage and discard the second full backup image from the backup storage such that the second full backup image is no longer accessible anywhere on the backup storage, thereby allowing re-use of storage space made available on the backup storage a result of discarding the second full backup image while still retaining the first full backup image representing the state of the data source at the time T1 and the first differential image representing the state of the data source at the time T2 on the backup storage.

8. The computer accessible storage medium as recited in claim 7, wherein the backup management software is further executable to access a third full backup image of the first sequence representing the state of the data source at a time T3 to create a second differential backup image representing the state of the data source at the time T3 by determining and storing data differences between the third full backup image and the second full backup image.

9. The computer accessible storage medium as recited in claim 7, wherein the backup management software is further executable to access a third full backup image of the first sequence representing the state of the data source at a time T3 to create a first incremental backup image representing the state of the data source at the time T3.

10. The computer accessible storage medium as recited in claim 9, wherein the backup management software is further executable to create the first incremental backup image by determining and storing data differences between the third full backup image and the second full backup image.

11. The computer accessible storage medium as recited in claim 7, wherein the backup management software is further executable to store the first sequence of backup images on the backup storage by performing a plurality of successive backup operations on the data source.

12. The computer accessible storage medium as recited in claim 11, wherein the backup management software is further executable to store the first sequence of backup images on the backup storage according to a backup schedule.

13. A method comprising:
storing on a backup storage a first sequence of two or more backup images of a data source including a first full backup image representing a state of the data source at a first time T1 and a second full backup image representing the state of the data source at a second time T2; and
in response to determining that a storage amount used to store the first sequence of two or more backup images exceeds a designated threshold:
accessing the first full backup image and the second backup image on the backup storage; and
creating a first differential backup image representing the state of the data source at the time T2 by determining and storing data differences between the second full backup image and the first full backup image; and
storing the first differential backup image on the backup storage and discarding the second full backup image from the backup storage such that the second full backup image is no longer accessible anywhere on the backup storage, thereby allowing re-use of storage space made available on the backup storage a result of discarding the second full backup image while still retaining the first full backup image representing the state of the data source at the time T1 and the first differential image representing the state of the data source at the time T2 on the backup storage.

14. The method as recited in claim 13, further comprising:
accessing a third full backup image of the first sequence representing the state of the data source at a time T3; and
creating a second differential backup image representing the state of the data source at the time T3 by determining and storing data differences between the third full backup image and the second full backup image.

15. The method as recited in claim 13, further comprising storing the first sequence of two or more backup images on the backup storage by performing a plurality of successive backup operations on the data source.

* * * * *